United States Patent
Takahashi et al.

(10) Patent No.: US 7,500,847 B2
(45) Date of Patent: Mar. 10, 2009

(54) DIE FOR FORMING HONEYCOMB STRUCTURE AND METHOD OF MANUFACTURING THE SAME

(75) Inventors: Hironori Takahashi, Nagoya (JP); Hirofumi Hosokawa, Nagoya (JP); Yoshimasa Kondo, Nagoya (JP); Masayuki Hironaga, Tokai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/186,970

(22) Filed: Jul. 22, 2005

(65) Prior Publication Data

US 2006/0034972 A1    Feb. 16, 2006

(30) Foreign Application Priority Data

Aug. 11, 2004    (JP) .............................. 2004-234706

(51) Int. Cl.
*B29C 47/20* (2006.01)
(52) U.S. Cl. .................... 425/380; 228/161; 228/174; 264/177.12; 425/461; 425/467
(58) Field of Classification Search ............ 264/177.12; 425/380, 461, 464, 466, 467; 228/161, 174
See application file for complete search history.

(56) References Cited

U.S. PATENT DOCUMENTS

| | | | | |
|---|---|---|---|---|
| 3,678,570 A | * | 7/1972 | Paulonis et al. ............. | 228/194 |
| 4,486,934 A | * | 12/1984 | Reed .......................... | 76/107.1 |
| 4,653,996 A | * | 3/1987 | Ozaki et al. .................. | 425/461 |
| 4,707,904 A | * | 11/1987 | Ozaki et al. .................... | 29/445 |
| 4,820,146 A | | 4/1989 | Inoue et al. ................. | 425/461 |
| 4,830,598 A | | 5/1989 | Inoue et al. ................. | 425/463 |
| 4,875,264 A | * | 10/1989 | Inoue et al. ................. | 76/107.1 |
| 5,761,787 A | * | 6/1998 | Kragle et al. ................. | 29/418 |
| 5,964,020 A | * | 10/1999 | Kragle et al. ................. | 29/423 |
| 5,964,964 A | * | 10/1999 | Kurebayashi et al. ....... | 148/320 |

FOREIGN PATENT DOCUMENTS

| | | |
|---|---|---|
| JP | A 2000-326318 | 11/2000 |
| JP | A 2003-285308 | 10/2003 |

* cited by examiner

*Primary Examiner*—Robert B Davis
*Assistant Examiner*—Joseph Leyson
(74) *Attorney, Agent, or Firm*—Oliff & Berridge, PLC (57) ABSTRACT

A die for forming a honeycomb structure may realize a sophisticated formability and superior resistance to wear. The die may be provided with a die base including two surfaces, one being provided with slits of honeycomb shape, and the other being provided with back holes through which a forming material may be introduced. The die base may include: a die precursor obtained by stacking and bonding a first member (one surface of the die base) and of tungsten carbide-based super hard alloy and a second member (the other surface of the die base) and of a metal material that causes at least up to three phase transformation of martensite transformation, bainite transformation, and pearlite transformation by cooling of an austenite phase together. Tensile and compressive stresses in a mutually bonded surface of the two plate-like members are 1000 MPa or less.

11 Claims, 7 Drawing Sheets

DIE FOR FORMING HONEYCOMB STRUCTURE AND METHOD OF MANUFACTURING THE SAME

BACKGROUND OF THE INVENTION

1. Field of the Invention

The present invention relates to a die for forming a honeycomb structure, and a method of manufacturing the die. The present invention particularly relates to a die for forming a honeycomb structure, which realizes a high formability and which has an excellent resistance to wear, and a method of manufacturing the die.

2. Description of the Related Art

As a method of forming a honeycomb structure made of a ceramic, a method has heretofore been performed broadly in which a forming material (clay) is extruded using a die for forming the honeycomb structure. The die comprises a die base provided with back holes for introducing the material therethrough, and slits of a lattice shape which communicate with the back holes. As to this die, usually in one surface of the die base, slits having widths corresponding to partition wall thicknesses of the honeycomb structure are arranged in the lattice shape or the like, and in an opposite surface (the other surface), the back holes communicating with the slits are opened in large areas. Moreover, the back holes are usually arranged in positions where the slits of the lattice shape or the like intersect each other, and the back holes communicate with the slits inside the die base. Therefore, a forming material, such as a ceramic material, introduced from the back holes, shift from the back holes having comparatively large inner diameters to the narrower slits, and is extruded as a formed article having a honeycomb structure from an opening of each slit.

Examples for use as the die base constituting the die for forming the honeycomb structure include: a plate-like member (die precursor) made of one type of alloy such as a stainless alloy or a super hard alloy; and a plate-like member (die precursor) obtained by bonding two different types of plate-like members together (e.g., Japanese Patent Application Laid-Open No. 2000-326318 and Japanese Patent Application Laid-Open No. 2003-285308).

However, as to the die base using a stainless steel or the like, since a resistance to wear of the substrate is low, there has been a problem that slits are worn by continuous extrusion, and a shape of an extruded honeycomb article gradually changes. Since the die base using the super hard alloy is superior in resistance to wear, the wear on the slits can be reduced. Conversely, when the back holes little influenced by the wear or the like are disposed, there is a problem that much labor and time are required. Since the super hard alloy is a brittle material, there is a problem that the die is broken by a pressure at an extruding time.

Moreover, for example, the die base (die precursor) is used in which two different types of plate-like members are bonded to each other. In this case, even if the slit is disposed which corresponds to the width of the partition wall of the honeycomb structure to be extruded, there has been a problem that the width of the slit is deformed after machining, and the honeycomb structure having a predetermined shape cannot be extruded because of the presence of a large residual stress. There has also been a problem that the super hard alloy is easily cracked, and a working tool such as an abrasive wheel is easily broken during the machining of the die base (die precursor).

SUMMARY OF THE INVENTION

The present invention has been developed in view of the above-described problem, and an object thereof is to provide a die for forming a honeycomb structure, which realizes a high formability and which is superior in resistance to wear, and a method of manufacturing the die.

According to the present invention, there are provided the following die for forming a honeycomb structure, and the following method of manufacturing the die.

[1] A die for forming a honeycomb structure, comprising: a die base having two surfaces, one of the two surfaces being provided with slits of a honeycomb shape, the other thereof being provided with back holes which communicate with the slits and introduce a forming material therethrough, the forming material introduced into the back holes being extruded from the slits to form the honeycomb structure, wherein the die base is obtained by stacking and bonding two plate-like members together to obtain a die precursor, and providing the slits and the back holes in the die precursor, the two plate-like members constituting the die precursor are a first member which is the one surface of the die base and is made of a tungsten carbide-based super hard alloy containing at least tungsten carbide, and a second member which is the other surface of the die base and is made of a metal material capable of causing at least one of three phase transformations of martensite transformation, bainite transformation, and pearlite transformation by cooling of an austenite phase, and tensile and compressive stresses in a mutually bonded surface of the two plate-like members constituting the die precursor are 1000 MPa or less.

[2] The die for forming the honeycomb structure according to the above [1], wherein the tungsten carbide-based super hard alloy constituting the first member is obtained by sintering tungsten carbide with at least one metal selected from the group consisting of iron, cobalt, nickel, titanium, and chromium.

[3] The die for forming the honeycomb structure according to the above [1] or [2], wherein the metal material constituting the second member contains at least one metal selected from the group consisting of iron, titanium, nickel, copper, and aluminum.

[4] The die for forming the honeycomb structure according to any one of the above [1] to [3], wherein a ratio of a thickness of the second member to that of the first member is in a range of 0.1 to 200.

[5] The die for forming the honeycomb structure according to any one of the above [1] to [4], wherein the die base further comprises: a solder material layer which is disposed between the first and second members constituting the die precursor and/or which permeates at least one of the first and second members.

[6] The die for forming the honeycomb structure according to the above [5], wherein a solder material constituting the solder material layer contains at least one metal selected from the group consisting of copper, silver, gold, nickel, and aluminum.

[7] A method of manufacturing a die for forming a honeycomb structure provided with slits of a honeycomb shape in one surface of a plate-like die precursor having two surfaces and provided with back holes which introduce a forming material therethrough in the other surface thereof to extrude the honeycomb structure, the method comprising the steps of stacking and bonding a plate-like first member made of a tungsten carbide-based super hard alloy containing at least tungsten carbide, and a plate-like second member made of a metal material capable of causing at least one of three phase transformations of martensite transformation, bainite transformation, and pearlite transformation by cooling of an austenite phase while heating these members at a temperature not less than a temperature at which the second member causes austenite transformation; and lowering a temperature of the bonded first and second members at a predetermined temperature drop rate to a temperature to start at least one phase transformation of the three phase transformations caused by the second member, thereby allowing the metal material constituting the second member to cause at least one of the three phase transformations in such a manner that tensile and compressive stresses remaining in a bonded surface between the first and second members are 1000 MPa or less to obtain the die precursor in which the first and second members are stacked and bonded together.

[8] The method of manufacturing the die for forming the honeycomb structure according to the above [7], wherein the temperature drop rate in lowering the temperature of the first and second members to the temperature to start at least one phase transformation is in a range of 0.1 to 100° C./min.

[9] The method of manufacturing the die for forming the honeycomb structure according to the above [7] or [8], further comprising a step of subjecting the obtained die precursor to a re-thermal treatment where heating or cooling is carried out at a rate of 0.1 to 100° C./min in a temperature range which is not more than the temperature to cause the austenite transformation in such a manner that the tensile and compressive stresses remaining in the bonded surface are 500 MPa or less.

[10] The method of manufacturing the die for forming the honeycomb structure according to any one of the above [7] to [9], wherein when the first and second members are stacked, a foil-like solder material is disposed between the first and second members.

[11] The method of manufacturing the die for forming the honeycomb structure according to any one of the above [7] to [10], wherein prior to bonding the first and second members together, at least a part of the back holes and/or a part of the slits are provided in at least one of the first and second members.

[12] The method of manufacturing the die for forming the honeycomb structure according to any one of the above [7] to [10], wherein after the first and second members have been stacked and bonded together to obtain the die precursor, the slits are provided in the first member, and the back holes are provided in the second member.

According to the present invention, the die for forming the honeycomb structure realizes a sophisticated formability, has an excellent resistance to wear, and can extrude the honeycomb structure with a high precision. According to the method of manufacturing the die for forming the honeycomb structure of the present invention, the above-described die for forming the honeycomb structure can be easily manufactured.

DESCRIPTION OF THE PREFERRED EMBODIMENT

Embodiments of a die for forming a honeycomb structure and a method of manufacturing the die of the present invention will be described hereinafter in detail with reference to the drawings. The present invention is not limited to or interpreted by the embodiments, and can be variously altered, modified, or improved based on knowledge of a person skilled in the art without departing from the scope of the present invention.

Figure 1:
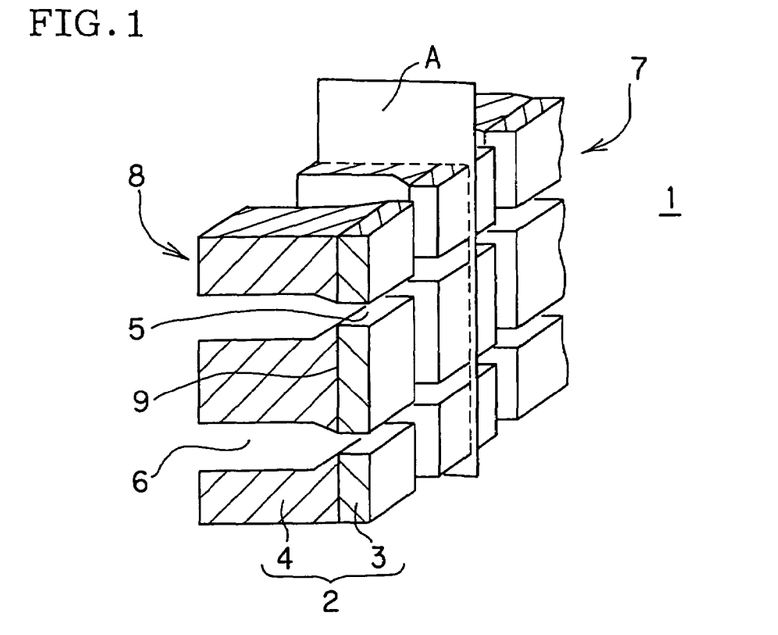
FIG. 1 is a perspective view schematically showing one embodiment of a die for forming a honeycomb structure of the present invention.
Figure 2:
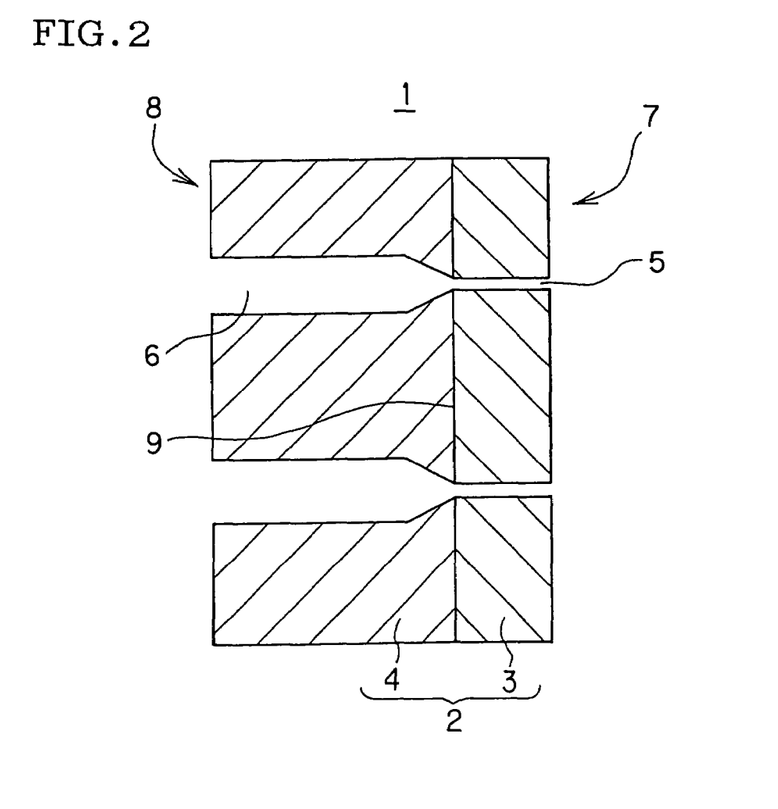
FIG. 2 is a sectional view showing a section of the die for forming the honeycomb structure of FIG. 1 cut by a plane A.

FIG. 1 is a perspective view schematically showing one embodiment of a die for forming a honeycomb structure of the present invention, and FIG. 2 is a sectional view showing a section of the die for forming the honeycomb structure of FIG. 1 cut by a plane A.

As shown in FIGS. 1 and 2, in the present embodiment, a die 1 for forming a honeycomb structure is provided with a die base 2 having two surfaces 7, 8, one surface 7 is provided with slits 5 of a honeycomb shape, and the other surface 8 is provided with back holes 6 which communicate with the slits 5 and introduce a forming material therethrough. The forming material introduced into the back holes 6 is extruded from the slits 5 to form the honeycomb structure.

In the die 1 for forming the honeycomb structure of the present embodiment, the die base 2 for use comprises: a die precursor which is obtained by stacking and bonding two plate-like members 3, 4 together and in which the above-described slits 5 and back holes 6 are provided. The two plate-like members 3, 4 constituting the die precursor comprise: a first member 3 which is the one surface 7 of the die base 2 and is made of a tungsten carbide-based super hard alloy containing at least tungsten carbide; and a second member 4 which is the other surface 8 of the die base 2 and is made of a metal material capable of causing at least one of three phase transformations of martensite transformation, bainite transformation, and pearlite transformation by cooling of an austenite phase. Tensile and compressive stresses in a mutually bonded surface of the two plate-like members 3, 4 constituting the die precursor are 1000 MPa or less.

As described above, in the die base 2 for use in the die 1 for forming the honeycomb structure of the present embodiment, the first member 3 is used in one surface 7 provided with the slits 5. The slits are portions directly related to a precision of extrusion (forming precision). The first member is made of the tungsten carbide-based super hard alloy superior in resistance to wear, and wear on the slits 5 can be reduced. In the other surface 8 provided with the back holes, the second member 4 is used which is made of the metal material capable of causing at least one of three phase transformations of the martensite transformation, bainite transformation, and pearlite transformation by the cooling of the austenite phase. The back holes 6 for introducing the forming material can be comparatively easily provided, and the die has at least a sufficient mechanical strength as the die for the extrusion.

Moreover, a member obtained by stacking and bonding two different types of members together has heretofore been used as the die precursor. In this case, large tensile and compressive stresses sometimes remain in the bonded surface. For example, when grooves such as slits are mechanically worked in the surface, these stresses are applied to the worked grooves, and widths of the slits sometimes change, or shapes of the slits are sometimes deformed. When larger stresses are added, cracks are generated from the slits, and the precursor is broken. Alternatively, during the working, a tool such as an abrasive wheel is sometimes broken. In the die 1 for forming the honeycomb structure of the present embodiment, tensile and compressive stresses (hereinafter sometimes referred to simply as "the stress remaining in the bonded surface 9") of 1000 MPa or less remain in a bonded surface 9 between the first member 3 and the second member 4 of the die precursor for use at a manufacturing time. The deformation or breakage of the slits 5, the breakage of the tool during the working and the like can be effectively prevented.

Specifically, in the die 1 for forming the honeycomb structure of the present embodiment, the second member 4 on the other surface 8 side of the die base 2 is made of the metal material capable of causing at least one of three phase transformations of the martensite transformation, bainite transformation, and pearlite transformation by the cooling of the austenite phase. Therefore, the tensile and compressive stresses remaining in the bonded surface 9 are adjusted utilizing a dimensional change of the second member 4 by the above-described phase transformation, and the stress remaining in the bonded surface 9 is set to 1000 MPa or less.

In the die precursor, the stress remaining in the bonded surface 9 is set to 1000 MPa or less utilizing the dimensional change of the second member 4 by the above-described phase transformation. For example, the die precursor may be subjected to a re-thermal treatment where heating or cooling is carried out at a predetermined rate so that the stress remaining in the bonded surface 9 is more preferably set to 500 MPa or less. A specific method of the re-thermal treatment will be described specifically in an embodiment of the method of manufacturing the die for forming the honeycomb structure.

It is to be noted that the tensile and compressive stresses remaining in the bonded surface 9 can be measured using an X-ray stress measurement device or the like. In a specific method, for example, first the surface of an object (die precursor) to be inspected is irradiated with a characteristic X-ray, and a reflected diffraction line is measured. Next, the stress of the surface of the object (die precursor) to be inspected is assumed as a two-dimensional stress constituted of components parallel to the surface, and can be calculated based on measured results of the resultant reflected diffraction line using various formulas in mechanics of elasticity. It is to be noted that preferable examples of a method of measuring the reflected diffraction line include a film method, a counter tube method and the like. This method is described, for example, in "X-ray Stress Measurement Method" edited by the Society of Materials Science, Japan, published by Yokensha, 1981. The tensile and compressive stresses remaining in the bonded surface 9 can be measured, for example, by measurement of a change amount of warp of the groove worked in the die precursor even without using the X-ray stress measurement device.

Figure 3:
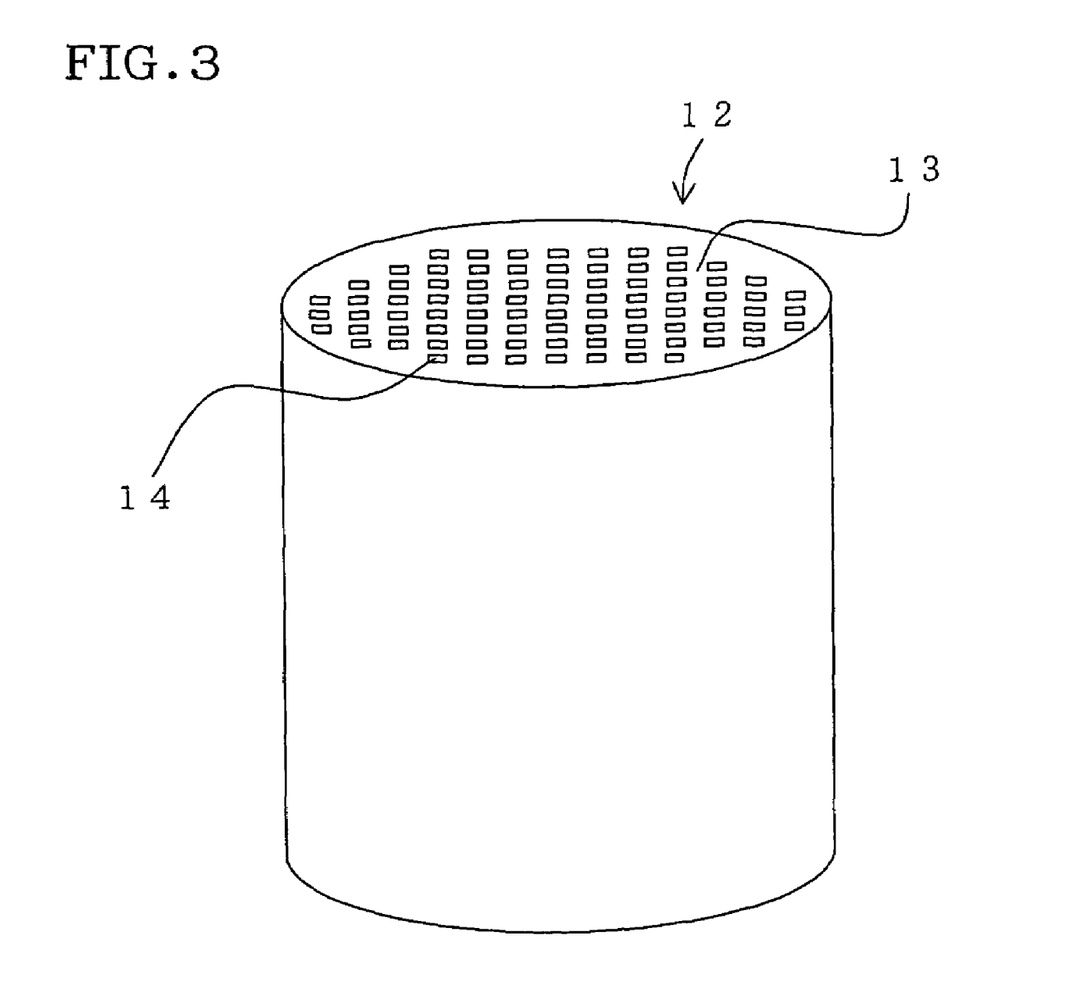
FIG. 3 is a perspective view showing a honeycomb structure extruded by the die for forming the honeycomb structure shown in FIG. 1.

It is to be noted that, for example, as shown in FIG. 3, in the honeycomb structure extruded by the die 1 for forming the honeycomb structure of the present embodiment, porous partition walls 13 are disposed, and a plurality of cells 14 are defined by the partition walls 13 to constitute fluid channels. A honeycomb structure 12 can be preferably used in a catalyst carrier utilizing a catalyst function for an internal combustion engine, a boiler, a chemical reaction apparatus, a reforming unit for a fuel battery or the like, a particulate capturing filter in an exhaust gas or the like.

The slits 5 of the die base 2, shown in FIGS. 1 and 2, are portions of the partition walls 13 of the honeycomb structure 12 shown in FIG. 3, and are formed into a lattice shape in accordance with the shape of the partition walls 13 as shown, for example, in FIG. 1.

In the die base 2 for use in the die 1 for forming the honeycomb structure of the present embodiment, the first member 3 is provided with the slits 5, and the second member 4 is provided with the back holes 6. A boundary portion (i.e., communicating portion) between the slit 5 and the back hole 6 may not be positioned in the bonded surface 9 between the first member 3 and the second member 4. For example, the slit 5 may be disposed in such a manner as to extend through the first member 3 to the second member 4. The back hole 6 may be disposed in such a manner as to extend through the second member 4 to the first member 3.

In the die 1 for forming the honeycomb structure of the present embodiment, the width of the slit 5, a size of an opening diameter of the back hole 6 and the like can be appropriately determined in accordance with the shape of the honeycomb structure 12 (see FIG. 3) to be extruded. For example, the width of the slit 5 is preferably 5000 to 5 µm, further preferably 500 to 10 µm. The size of the opening diameter of the back hole 6 is preferably 10 to 0.1 mm, further preferably 3 to 0.5 mm. There is not any special limitation as to a method of providing the slits 5 or the back holes 6. For example, a conventional known method can be preferably used by electrolytic machining (ECM), electric discharge machining (EDM), or mechanical working by an abrasive wheel, a drill, or the like. It is to be noted that in the die 1 for forming the honeycomb structure shown in FIG. 1, the slits 5 constitute a quadrangular lattice shape, but another polygonal lattice shape may be constituted.

Moreover, the back holes 6 introduce the forming material for the extrusion from the other surface 8, and are usually disposed in such a manner as to communicate with the positions where the slits 5 intersect with one another. By this constitution, the forming material introduced into the back holes 6 can be spread uniformly over the slits 5, and more sophisticated formability can be realized.

As shown in FIGS. 1 and 2, in the die 1 for forming the honeycomb structure of the present embodiment, the tungsten carbide-based super hard alloy (hereinafter sometimes referred to simply as the "super hard alloy") constituting the first member 3 is an alloy containing at least tungsten carbide, and preferably an alloy obtained by sintering tungsten carbide with at least one metal selected from the group consisting of iron (Fe), cobalt (Co), nickel (Ni), titanium (Ti), and chromium (Cr). As to the tungsten carbide-based super hard alloy using as a bonding material at least one metal selected from the group consisting of iron, cobalt, nickel, titanium, and chromium, especially a resistance to wear or a mechanical strength is superior. Specific examples of the alloy include a super hard alloy using Co as the bonding material, WC—Co0.1 to 50 mass % or the like.

Moreover, there is not any special limitation as to the metal material constituting the second member 4 in the die 1 for forming the honeycomb structure of the present embodiment as long as the metal material can cause at least one of three phase transformations of the martensite transformation, bainite transformation, and pearlite transformation by the cooling of the austenite phase. This metal material is preferably a metal or an alloy containing at least one metal selected from the group consisting of iron (Fe), titanium (Ti), nickel (Ni), copper (Cu), and aluminum (Al). This metal material is preferably a stainless steel, and preferable examples of the metal material include SUS630 (C; 0.07 or less, Si; 1.00 or less, Mn; 1.00 or less, P; 0.040 or less, S; 0.030 or less, Ni; 3.00 to 5.00, Cr; 15.50 to 17.50, Cu; 3.00 to 5.00, Nb+Ta; 0.15 to 0.45, Fe; balance (unit is mass %). In the metal material, the back holes are comparatively easily worked, and the article is inexpensive, and can be preferably used as the second member 4. Furthermore, in this metal material, the above-described metal or alloy preferably contains additives such as carbon (C), silicon (Si), chromium (Cr), manganese (Mn), molybdenum (Mo), platinum (Pt), and palladium (Pd).

In the die 1 for forming the honeycomb structure of the present embodiment, there is not any special limitation as to thicknesses of the first member 3 and the second member 4 constituting the die precursor. Considering that the stress remaining in the bonded surface 9 can be effectively decreased when the members are bonded to each other, and further considering general shapes of the slit 5 and the back hole 6, a ratio of the thickness of the second member 4 to that of the first member 3 is preferably 0.1 to 200, further preferably 1 to 10.

Figure 4:
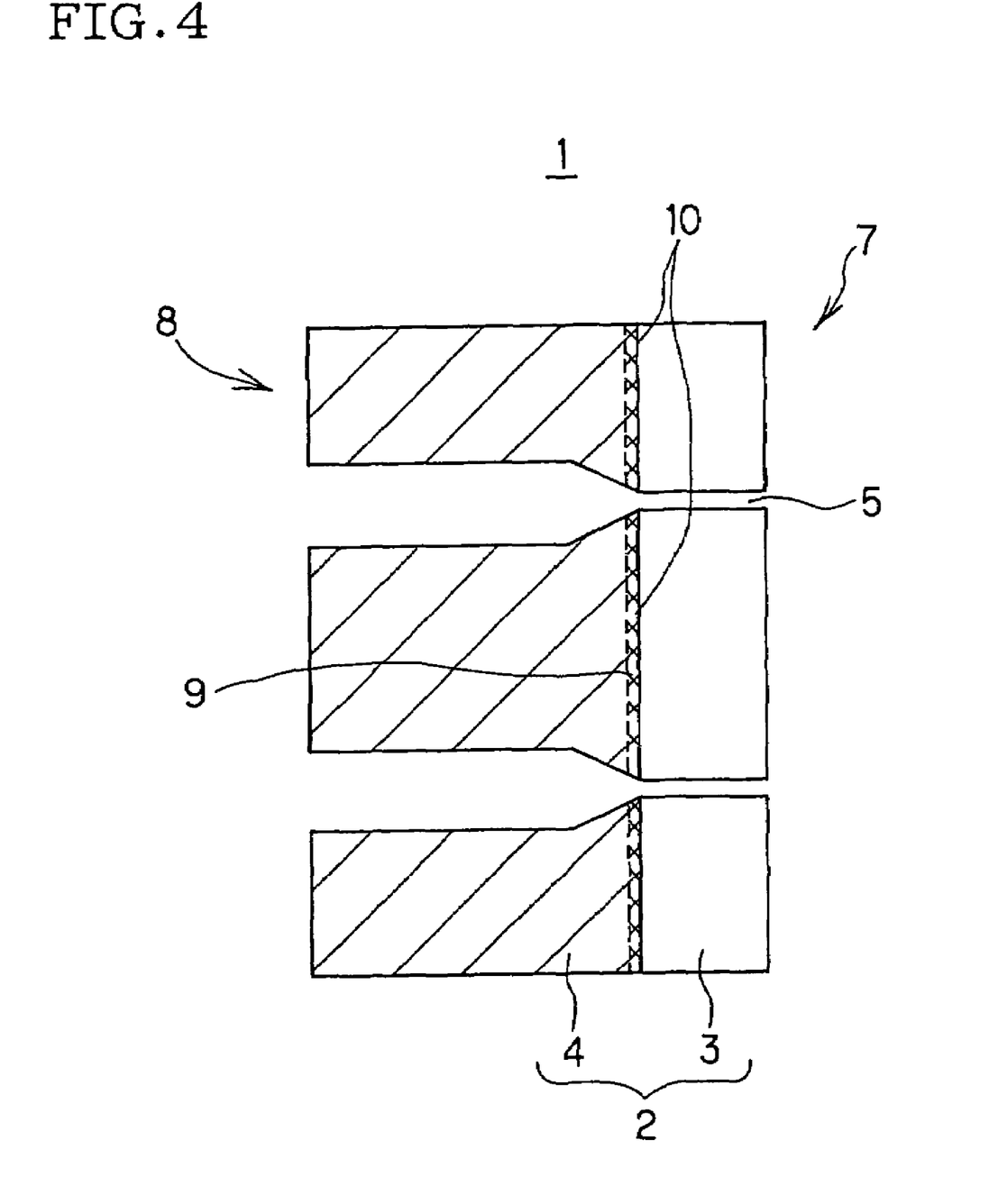
FIG. 4 is a sectional view showing another embodiment of the die for forming the honeycomb structure of the present invention.

Moreover, in the die 1 for forming the honeycomb structure of the present embodiment, as shown in FIG. 4, the die base 2 preferably further comprises: a solder material layer 10 which is disposed between the first member 3 and the second member 4 constituting the die precursor and/or which permeates at least one of the first member 3 and the second member 4. By this constitution, the first member 3 and the second member 4 are satisfactorily bonded together. It is to be noted that, in FIG. 4, elements similar to those constituting the die 1 for forming the honeycomb structure shown in FIG. 2 are denoted with the same reference numerals, and description is omitted.

It is to be noted that when the solder material layer 10 permeates at least one of the first member 3 and the second member 4, the solder material layer 10 does not exist as a single layer, and there is not a possibility that the mechanical strength of the die base 2 is lowered by the solder material layer 10. Since the solder material layer 10 does not exist in an interface of the die base 2, corrosion or wear from the solder material layer 10 can be effectively prevented.

Therefore, as the solder material layer 10, it is preferable to use a thin material which satisfactorily permeates the metal material constituting the second member 4. Specifically, a solder material constituting the solder material layer 10 preferably contains at least one metal selected from the group consisting of copper (Cu), silver (Ag), gold (Au), nickel (Ni), and aluminum (Al). Especially, when the solder material constituting the solder material layer 10 is an alloy containing copper (Cu), permeability is preferably high with respect to a stainless steel which can be preferably used as the second member 4. When the solder material constituting the solder material layer 10 is an alloy, the layer preferably further contains an additive such as a palladium (Pd), silicon (Si), tin (Sn), cobalt (Co), phosphor (P), manganese (Mn), zinc (Zn), or boron (B). When this additive is further contained, a melting point can be controlled, or bonding reliability can be enhanced.

Next, one embodiment of a method of manufacturing a die for forming a honeycomb structure of the present invention will be specifically described.

According to the present embodiment, there is a method of manufacturing a die for forming a honeycomb structure, for providing slits of a honeycomb shape in one surface of a plate-like die precursor having two surfaces, and providing back holes which introduce a forming material therethrough in the other surface to extrude the honeycomb structure. As shown in FIG. 1, onto a plate-like first member 23 made of a tungsten carbide-based super hard alloy containing at least tungsten carbide, a plate-like second member 24 is stacked and bonded which is made of a metal material capable of causing at least one of three phase transformations of martensite transformation, bainite transformation, and pearlite transformation by cooling of an austenite phase in a heated state at a temperature not less than a temperature at which the second member 24 causes austenite transformation. A temperature of the bonded first member 23 and second member 24 is lowered at a temperature to start at least one of the three phase transformations which can be caused by the second member 24 at a predetermined temperature drop rate. Accordingly, the metal material constituting the second member 24 is allowed to cause at least one of the three phase transformations in such a manner that tensile and compressive stresses remaining in the bonded surface between the first member 23 and the second member 24 are 1000 MPa or less to obtain a die precursor 22 obtained by stacking and bonding the second member 24 onto the first member 23. By this constitution, the die 1 for forming the honeycomb structure shown in FIG. 1 can be easily manufactured.

In the method of manufacturing the die for forming the honeycomb structure of the present embodiment, when the die precursor 22 constituting the die base 2 (see FIG. 1) is obtained, the plate-like first member 23 and the plate-like second member 24 are stacked and bonded together in a predetermined method. The first member is made of the tungsten carbide-based super hard alloy containing at least tungsten carbide. The second member is made of the metal material which can cause at least one of the three phase transformations of the martensite transformation, bainite transformation, and pearlite transformation by the cooling of the austenite phase. Accordingly, the tensile and compressive stresses in the mutually bonded surface are set to 1000 MPa or less.

Specifically, first, the plate-like first member 23 is made using the tungsten carbide-based super hard alloy containing at least tungsten carbide. The plate-like second member 24 is made using the metal material which can cause at least one of the three phase transformations of the martensite transformation, bainite transformation, and pearlite transformation by the cooling of the austenite phase. Here, there is not any special limitation as to the shapes of the first member 23 and the second member 24. When the first member 23 and the second member 24 are stacked to obtain one die precursor 22, sizes of the respective surfaces of the members are preferably set to be appropriately equal to each other.

Next, the resultant first member 23 and second member 24 are stacked and bonded together in such a manner that the tensile and compressive stresses remaining in the bonded surface are 1000 MPa or less. In the present embodiment, the members are bonded together on a condition that the phase transformation is caused in the second member 24. Accordingly, the stress remaining in the bonded surface is adjusted. More specifically, the first member 23 and the second member 24 are stacked and bonded together in the heated state at the temperature not less than the temperature at which the second member 24 causes the austenite transformation. As to the bonded first member 23 and second member 24, the temperature is lowered at the temperature to start at least one of the three phase transformations which can be caused by the second member 24 at a predetermined temperature drop rate, and the second member 24 is allowed to cause at least one of the above-described phase transformations.

When the second member 24 causes the phase transformation, the dimension largely changes. A ratio at which the dimension of the second member 24 changes depends on the temperature drop rate during the phase transformation, and an added alloy element. When the rate and the element are adjusted, the dimensional change of the second member 24 can be controlled to a certain degree. When the die precursor 22 is manufactured utilizing this, the temperature drop rate and the added element are adjusted in such a manner that the dimensional change of the first member 23 comes close to that of the second member 24, that is, the tensile and compressive stresses remaining in the bonded surface are 1000 MPa or less.

It is to be noted that in the method of manufacturing the die for forming the honeycomb structure of the present embodiment, the resultant die precursor 22 is preferably further subjected to a re-thermal treatment to raise the temperature of the precursor or cool the precursor at a rate of 0.1 to 100° C./min in a temperature range which is not more than the temperature to cause the austenite transformation in such a manner that the tensile and compressive stresses remaining in the bonded surface are 500 MPa or less. In the die precursor 22, the stress remaining in the bonded surface is preferably as close to zero as possible. In this method, the die precursor 22 is preferably subjected to the re-thermal treatment, and the stress remaining in the bonded surface is preferably set to be smaller (100 MPa or less).

As to the above-described heating temperature, the temperature drop rate, and a temperature at which the lowering of the temperature ends, they can be appropriately selected in accordance with the material, size or the like of the first member 23 or the second member 24. For example, when the second member 24 is an iron alloy, the above-described heating temperature is preferably 900 to 1200° C., further preferably 1000 to 1150° C. The temperature drop rate is preferably 0.1 to 100° C./min, further preferably 1 to 10° C./min. The temperature at which the lowering of the temperature ends may be a temperature at which at least one of the three phase transformations is started, and may be a lower temperature. For example, the temperature may be lowered at room temperature or the like.

Next, slits 25 of the honeycomb shape are provided in one surface 27 of the resultant die precursor 22, back holes 26 which communicate with the slits 25 and introduce the forming material therethrough are provided in the other surface 28, and a die 21 for forming a honeycomb structure is manufactured. A step of providing the slits 25 and the back holes 26 can be performed in conformity to a conventional method of manufacturing the die for forming the honeycomb structure. For example, the slits 25 can be obtained by grinding by a diamond abrasive wheel, or electric discharge machining (EMD). The back holes 26 can be obtained by laser working, drill working, electrolytic machining or the like.

Figure 6:
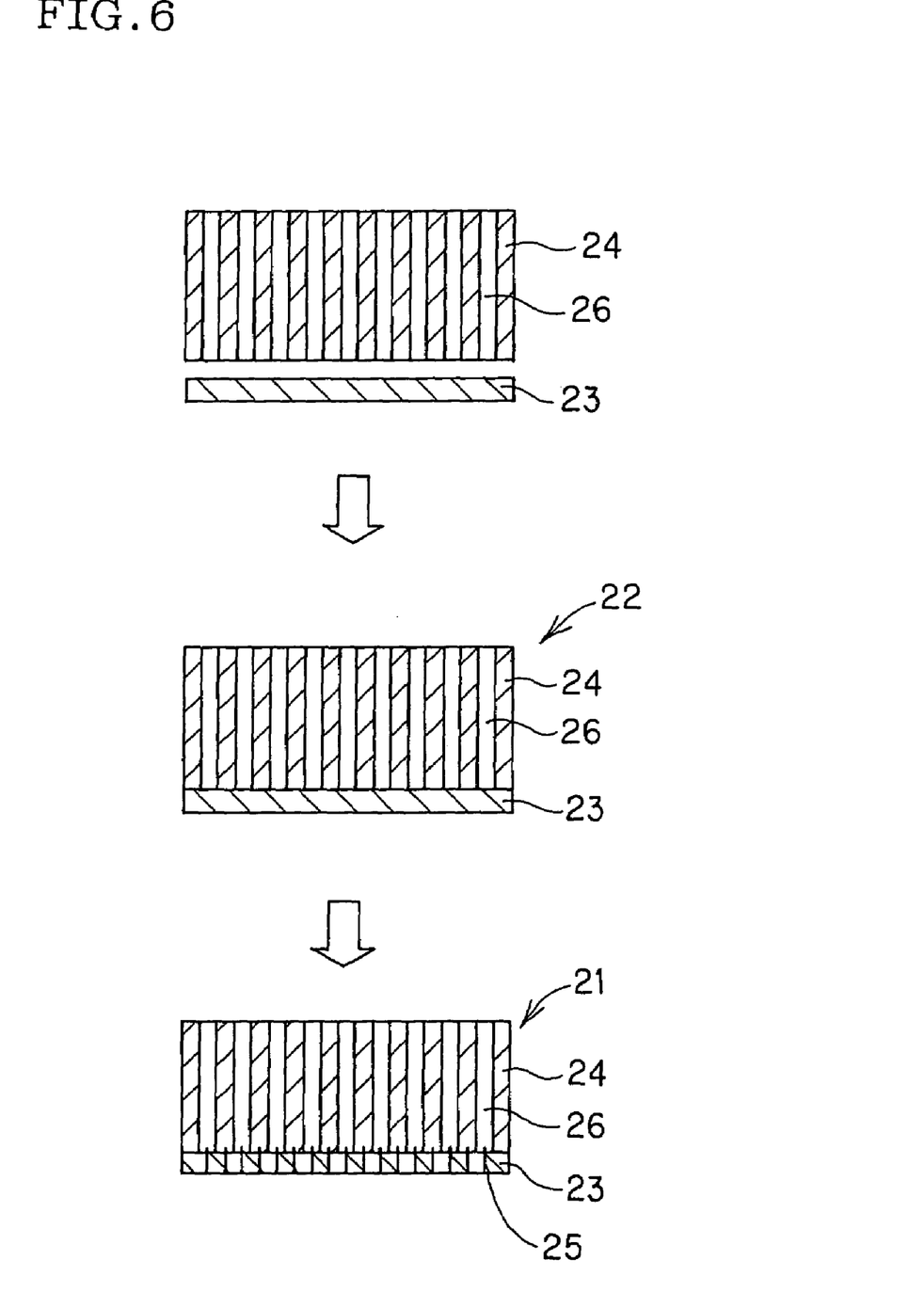
FIG. 6 is an explanatory view showing another example of the step of manufacturing the die precursor in one embodiment of the method of manufacturing the die for forming the honeycomb structure according to the present invention.
Figure 7:
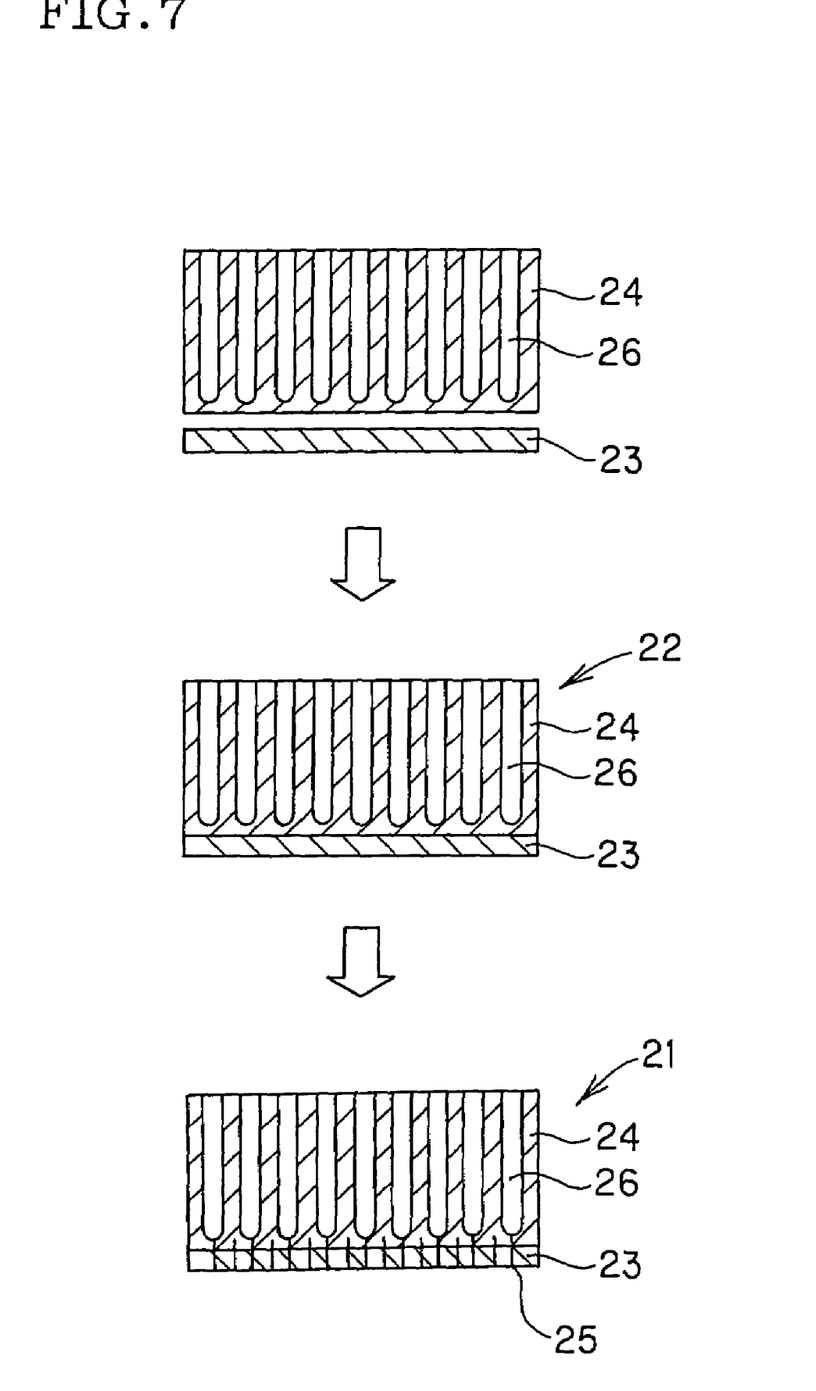
FIG. 7 is an explanatory view showing another example of the step of manufacturing the die precursor in one embodiment of the method of manufacturing the die for forming the honeycomb structure according to the present invention.

It is to be noted that in the method of manufacturing the die for forming the honeycomb structure of the present embodiment, as shown in FIG. 6, at least some of the back holes 26 and/or some of the slits 25 may be provided in at least one of the first member 23 and the second member 24 before bonding the first member 23 and the second member 24 together. It is to be noted that FIG. 6 shows a step of providing the back holes 26 in the second member 24 before bonded, and bonding the second member 24 to the first member 23. Thus, to provide the back holes 26 or the slits 25 in the die precursor 22, at least some of the holes or the slits may be provided before bonding the second member 24 to the first member 23. Especially, as shown in FIG. 6, when at least some of the back holes 26 are provided in the second member 24 before bonded, a step of providing the back holes 26 can be more easily performed. Furthermore, after the back holes 26 are provided beforehand, the second member 24 may be coated with CVD or the like to thereby enhance a resistance to wear. As shown in FIG. 7, after bonding the second member 24 to the first member 23 without completely providing the back holes 26 in the second member 24, the back holes 26 may be extended through the member, and completed.

Figure 8:
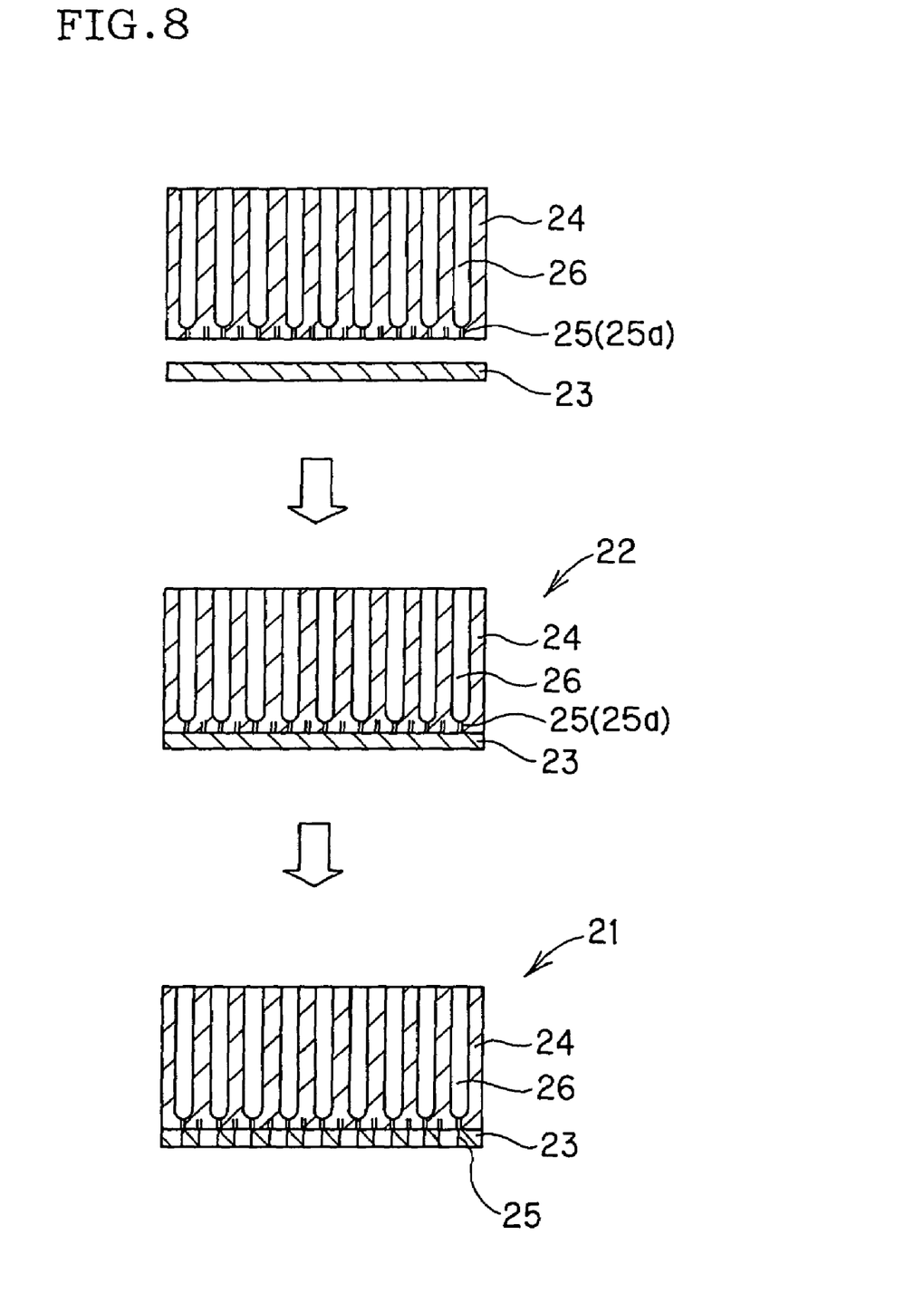
FIG. 8 is an explanatory view showing another example of the step of manufacturing the die precursor in one embodiment of the method of manufacturing the die for forming the honeycomb structure according to the present invention.

Furthermore, as shown in FIG. 8, some of the back holes 26 or the slits 25 may be provided beforehand in the second member 24 before bonded. By this constitution, the slits 25 may be provided only in the first member 23 in the die precursor 22 after bonded, and the working steps with respect to the die precursor 22 are remarkably facilitated. When some of the slits 25 are provided beforehand, slits 25a to be provided in the second member 24 are broader than the original slits 25, and portions which change from the back holes 26 to the slits 25 may be used as constricted portions for smoothly moving the forming material without any trouble.

Furthermore, although not shown, after some of the back holes or the slits are provided in the first member before bonded, the second member may be bonded to the first member to obtain the die precursor. When at least some of the back holes and/or the slits are provided beforehand, they may be provided in either of the first and second members. Needless to say, they may be provided in both of the first and second members.

Figure 5:
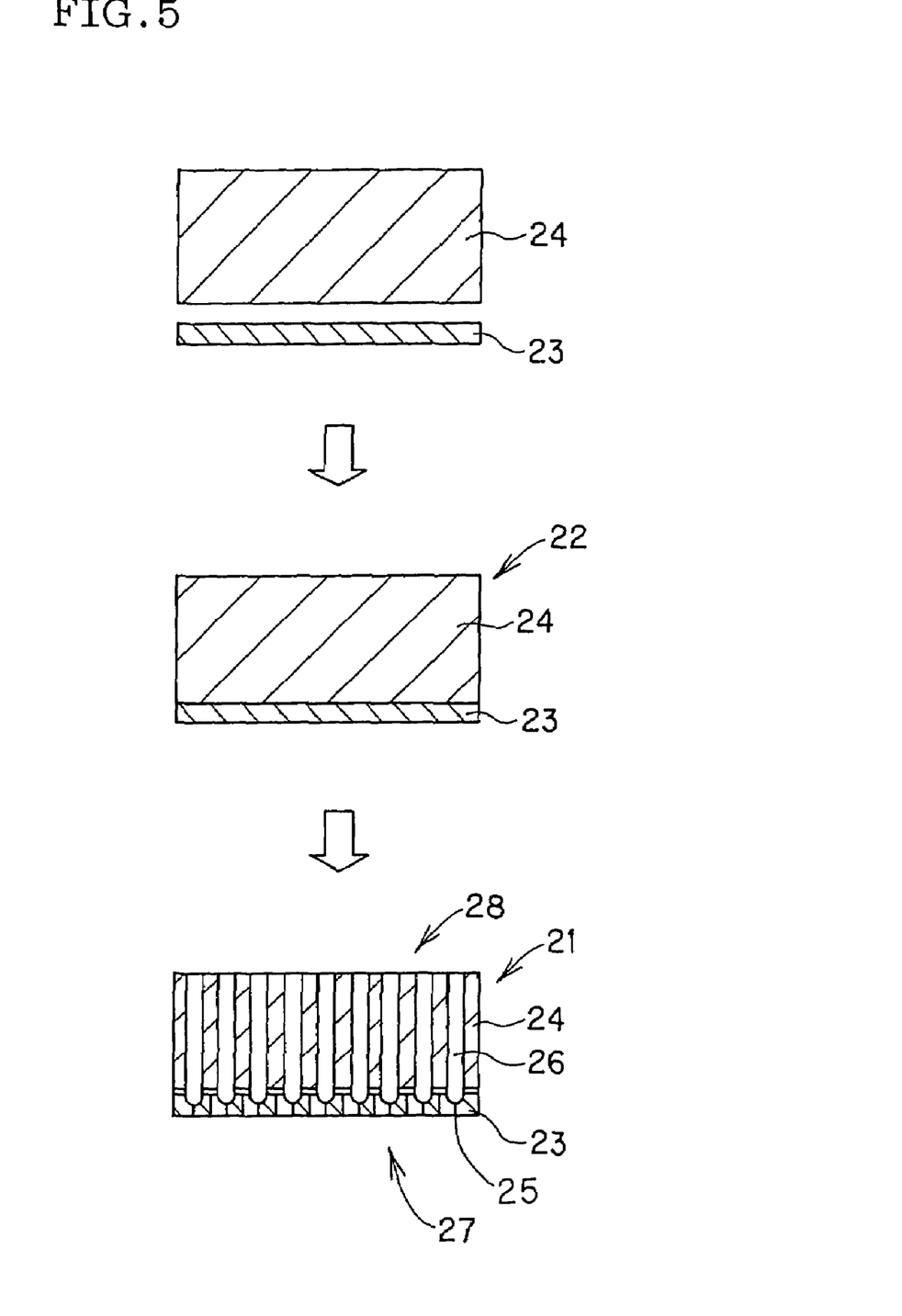
FIG. 5 is an explanatory view showing one example of a step of manufacturing a die precursor in one embodiment of a method of manufacturing the die for forming the honeycomb structure according to the present invention.

Needless to say, as shown in FIG. 5, after the first member 23 and the second member 24 are stacked and bonded together to obtain the die precursor 22 without providing beforehand any back hole 26 or the like in the second member 24, the slits 25 may be provided in the first member 23 (in one surface 27), and the back holes 26 may be provided in the second member 24 (in the other surface 28).

As described above, the die 1 for forming the honeycomb structure shown in FIG. 1 can be easily manufactured. According to this manufacturing method, it is possible to adjust the tensile and compressive stresses remaining in the bonded surface between the first member 23 and the second member 24 easily. The die precursor 22 can be securely obtained in which the tensile and compressive stresses are 1000 MPa or less.

EXAMPLES

The present invention will be described hereinafter in more detail in accordance with an example, and the present invention is not limited to the following example.

Example 1

A die for forming a honeycomb structure was manufactured, comprising: a die base having two surfaces. One of the surfaces was provided with slits of a honeycomb shape, the other surface was provided with back holes which communicated with the slits and introduced a forming material therethrough, and the forming material introduced into the back holes was extruded from the slits to form the honeycomb structure. In the die for forming the honeycomb structure of Example 1, a die precursor constituting the die base was used, which was obtained by stacking and bonding a first member made of a super hard alloy of WC-16 mass % Co, and a second member made of SUS630 (C; 0.07 or less, Si; 1.00 or less, Mn; 1.00 or less, P; 0.040 or less, S; 0.030 or less, Ni; 3.00 to 5.00, Cr; 15.50 to 17.50, Cu; 3.00 to 5.00, Nb+Ta; 0.15 to 0.45, Fe; balance (unit was mass %) together in such a manner that tensile and compressive stresses in a mutually bonded surface were 500 MPa.

It is to be noted that a shape of the first member is a square having a surface size of 80 mm×80 mm and a thickness of 2.5 mm, and a shape of the second member is a square having a surface size of 80 mm×80 mm, and a thickness of 15 mm. The die base has a solder material layer which permeates the alloy (SUS630) constituting the second member in a depth of about 0.1 mm. In the present example, some of the back holes and the slits were provided in the second member before bonding the second member to the first member. After bonding the second member to the first member, the slits were provided in the first member to manufacture the die for forming the honeycomb structure.

The back holes each having an opening diameter of about 1 mm were provided in the second member in such a manner as to be positioned in intersections of the slits arranged in a lattice shape. The slits were formed into a quadrangular lattice shape by a diamond abrasive wheel. A width of the slit was set to about 100 µm, a depth was about 2.5 mm, and an interval between the slits disposed adjacent to each other was about 1000 µm.

It could be confirmed that in the die for forming the honeycomb structure of Example 1, after providing the slits in the die precursor, deformed amounts of the widths of the slits were 10% or less to such an extent that there was not any problem in view of a forming precision. Moreover, since tensile and compressive stresses remaining in the bonded surface of the die precursor were 500 MPa or less, the widths of the slits were inhibited from being deformed. When the similar die precursor was subjected to a re-thermal treatment, a stress was 50 MPa or less, and the deformed amount of the slit width was 1% or less. As to a resistance to wear, when extrusion of 10000 m was performed, an increase of about 2 µm was observed in the slit width.

Comparative Example 1

A die for forming a honeycomb structure, similar to the die for forming the honeycomb structure of Example 1, was manufactured using a die precursor entirely made of SUS630. When extrusion of 1000 m was performed on conditions similar to those of Example 1, a slit width increase of about 10 µm was observed, and the slit width increased at a speed about 50 times that of the die for forming the honeycomb structure of Example 1.

According to the present invention, a die for forming a honeycomb structure has an excellent resistance to wear, and can realize a sophisticated formability. Especially, since portions of a die base provided with slits are superior in resistance to wear, cost reduction of the honeycomb structure to be formed can be realized. In a method of manufacturing a die for forming a honeycomb structure of the present invention, the above-described die for forming the honeycomb structure can be easily manufactured.

What is claimed is:

1. A die for forming a honeycomb structure, comprising: a die base having two surfaces, one of the two surfaces being provided with slits of a honeycomb shape, the other thereof being provided with back holes which communicate with the slits and introduce a forming material therethrough, the forming material introduced into the back holes being extruded from the slits to form the honeycomb structure, wherein the die base is obtained by stacking and bonding two plate-like members comprising a first member and a second member to obtain a die precursor, and providing the slits and the back holes in the die precursor, wherein the first member is the one surface of the die base and is made of a tungsten carbide-based super hard alloy containing at least tungsten carbide, wherein the second member is the other surface of the die base, is made of a metal material capable of causing at least one of three phase transformations of martensite transformation, bainite transformation, and pearlite transformation by cooling of an austenite phase, and whose phase has been transformed into at least one of three phase transformations of martensite transformation, bainite transformation, and pearlite transformation by cooling of an austenite phase after bonding of the first and second member, and wherein the die for forming a honeycomb structure is substantially free from breakage and is formed by mechanically processing the die precursor whose tensile and compressive stresses in a mutually bonded surface of the two plate-like members constituting the die precursor are 50 MPa or less.

2. The die for forming the honeycomb structure according to claim 1, wherein the tungsten carbide-based super hard alloy constituting the first member is obtained by sintering tungsten carbide with at least one metal selected from the group consisting of iron, cobalt, nickel, titanium, and chromium.

3. The die for forming the honeycomb structure according to claim 1, wherein the metal material constituting the second member contains at least one metal selected from the group consisting of iron, titanium, nickel, copper, and aluminum.

4. The die for forming the honeycomb structure according to claim 1, wherein a ratio of a thickness of the second member to that of the first member is in a range of 0.1 to 200.

5. The die for forming the honeycomb structure according to claim 1, wherein the die base further comprises: a solder material layer which is disposed between the first and second members constituting the die precursor and/or which permeates at least one of the first and second members.

6. The die for forming the honeycomb structure according to claim 5, wherein a solder material constituting the solder material layer contains at least one metal selected from the group consisting of copper, silver, gold, nickel, and aluminum.

7. A method of manufacturing the die of claim 1 for forming a honeycomb structure, the method comprising the steps of:

stacking and bonding the plate-like first member made of a tungsten carbide-based super hard alloy containing at least tungsten carbide, and the plate-like second member made of a metal material capable of causing at least one of three phase transformations of martensite transformation, bainite transformation, and pearlite transformation by cooling of an austenite phase while heating these members at a temperature not less than a temperature at which the second member causes austenite transformation; lowering a temperature of the bonded first and second members at a predetermined temperature drop rate to a temperature to start at least one phase transformation of the three phase transformations caused by the second member, thereby allowing the metal material constituting the second member to cause at least one of the three phase transformations in such a manner that tensile and compressive stresses remaining in a bonded surface between the first and second members are 50 MPa or less to obtain the die precursor in which the first and second members are stacked and bonded together; and mechanically processing the die precursor to form the honeycomb structure that is substantially free from breakage.

8. The method of manufacturing the die for forming the honeycomb structure according to claim 7, wherein the temperature drop rate in lowering the temperature of the first and second members to the temperature to start at least one phase transformation is in a range of 0.1 to 100° C./min.

9. The method of manufacturing the die for forming the honeycomb structure according to claim 7, wherein when the first and second members are stacked, a foil-like solder material is disposed between the first and second members.

10. The method of manufacturing the die for forming the honeycomb structure according to claim 7, wherein prior to bonding the first and second members together, at least a part of the back holes and/or a part of the slits are provided in at least one of the first and second members.

11. The method of manufacturing the die for forming the honeycomb structure according to claim 7, wherein after the first and second members have been stacked and bonded together to obtain the die precursor, the slits are provided in the first member, and the back holes are provided in the second member.

* * * * *